Patented Mar. 31, 1925.

1,531,613

UNITED STATES PATENT OFFICE.

OSCAR HOMMEL, OF PITTSBURGH, PENNSYLVANIA.

GLASS DECORATING.

No Drawing.    Application filed March 17, 1922.   Serial No. 544,663.

*To all whom it may concern:*

Be it known that I, OSCAR HOMMEL, a citizen of the United States, and a resident of Pittsburgh, in the county of Allegheny and State of Pennsylvania, have invented a new and useful Improvement in Glass Decorating, of which the following is a specification.

My invention relates to methods of, and means for, decorating glassware.

One object of my invention is to provide a method of producing decorations in relief on glassware, chinaware and vitreous surfaces.

Another object of my invention is to provide a method of decorating ware of the above character that shall produce a smooth decorated surface.

Another object of my invention is to provide a method of decorating glass and vitreous ware that shall be applicable to stencil work.

A further object of my invention is to provide a method of decorating glassware or other ware that shall be inexpensive to apply and effective in the results.

Heretofore, it has been the usual practice to paint glassware and other similar ware and then burn or fire the same to decorate it. Glassware and the like has also been decorated by sprinkling powdered glass thereon and firing it. The former method was expensive because it must of necessity be done by an artist, and the latter method did not produce satisfactory results because the decorations were stippled and not smooth.

In practicing my invention, I use a combination of different grades of powdered glass and this produces a smooth even surface when fired.

In order to decorate a piece of glassware, chinaware or ware having a vitreous surface in accordance with my invention, the design is marked on the ware with a vegetable oil of rather low viscosity. This design may be stamped on with a rubber stamp, stenciled or may be applied with a brush, as desired. While it is suggested that the oil be of low viscosity, the requirements are that it not run readily but have the property of absorbing foreign particles placed thereon. While it is not absolutely necessary, it may be preferable to mix the oil with a low melting glass, however, this is not essential.

After the glassware or the like is lined with the design in oil, a glass powder or granulated glass is sprinkled thereon. This granulated glass is of the color desired to produce in the decoration. If a high relief is used, very coarse granules are applied first but if a rather low relief is desired relatively fine granules are used.

After the desired relief is obtained with the coarse glass very finely powdered glass is sprinkled over the design. This fills all the crevices between the coarse particles and when the ware is fired by placing it in a firing oven the design assumes a smooth even surface of any desired relief depending on the coarseness of the first or base granulated glass.

What I consider new in my invention is the use in decorating of powdered and granulated glass of different fineness to obtain the desired relief and still retain a smooth surface. It has been observed that if only one degree of granules are used the decoration assumes a sort of stippled or mottled surface. I have found that by my method a decoration comparable to a painted decoration is obtained and with the further advantage that it is uniform whereas a hand painted design varies in its characteristics depending upon the artist.

My invention is applicable to decorating glassware, enamel ware, tiles, chinaware and any ware or article having a vitreous surface.

My invention is not limited to the exact methods set forth as many modifications may be made without departing from the spirit and scope of the invention as set forth in the appended claims.

I claim as my invention:

1. The method of decorating glassware and similar articles which consists in forming the design in oil on the ware, sprinkling granulated glass of any desired texture on the oil, then sprinkling powdered glass thereon of very fine texture and fusing the material.

2. The method of decorating glassware and the like which consists in forming the design in oil on the ware, sprinkling two coatings of granulated glass thereon of different degrees of fineness and firing the same.

3. The method of decorating glassware and the like which consists in forming the design in oil on the ware, sprinkling coatings of coarse and finely granulated glass thereon and firing the same.

4. The method of decorating glassware and the like which consists in forming the design in oil on the glass, sprinkling coarsely ground glass on the oil until the desired relief is obtained, then sprinkling finely ground glass thereon to obtain a uniform texture and then firing the same.

5. The method of decorating glassware and the like which consists in forming the design in oil on the ware, then sprinkling coarsely ground glass on the oil until the desired relief is obtained, sprinkling finely ground glass thereon to obtain a uniform texture and then firing the article.

6. The method of decorating glassware and the like which consists in forming the design on the ware in an oil which has low viscosity, sprinkling granulated colored glass thereon of coarse texture, then sprinkling powdered colored glass thereon of fine texture and firing the same.

7. The method of decorating glassware and the like which consists in causing a relatively coarse granulated glass to adhere to the ware to be decorated, sprinkling a relatively fine powdered glass over the relatively coarse glass and then firing the same.

8. The method of decorating glassware and the like which consists in causing a relatively coarse and a relatively fine powdered glass to adhere to the glassware to be decorated and then firing the same to give a smooth relief decoration.

9. The method of decorating glassware which consists in first sprinkling relatively coarse and then relatively fine glass granules on the ware and firing it to obtain a smooth relief decoration.

10. The method of decorating ceramics which consists in forming the design on the ware, sprinkling two coatings of granulated glass of different degrees of fineness on the design and firing the same.

11. The method of decorating vitreous ware which consists in forming a design on the ware, sprinkling relatively coarse granulated glass on the design, then sprinkling a relatively fine powdered glass over the relatively coarse glass and then firing the same.

In testimony whereof, I have hereunto subscribed my name this fourteenth day of March, 1922.

OSCAR HOMMEL.